US006903937B2

(12) United States Patent
Watanabe (10) Patent No.: US 6,903,937 B2
(45) Date of Patent: Jun. 7, 2005

(54) OUTER CASING OF ELECTRIC EQUIPMENT

(75) Inventor: Masakazu Watanabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/950,432

(22) Filed: Sep. 28, 2004

(65) Prior Publication Data

US 2005/0068749 A1   Mar. 31, 2005

(30) Foreign Application Priority Data

Sep. 29, 2003  (JP) .......................... 2003-271469 U (51) Int. Cl.[7] ............................ H05K 5/02; H05K 7/18
(52) U.S. Cl. ....................... 361/752; 361/361; 361/679; 361/730; 174/50; 174/50.54; 174/52.1; 312/223.1; 312/223.2; 211/41.12
(58) Field of Search ................................ 361/679, 683, 361/724, 725, 728–731, 752, 796, 684–686; 174/50, 50.54, 52.1; 312/223.1, 223.2; 211/41.12, 211/41.17

(56) References Cited

U.S. PATENT DOCUMENTS

| | | | | |
|---|---|---|---|---|
| 5,510,955 | A | * | 4/1996 | Taesang ..................... 361/685 |
| 6,025,987 | A | * | 2/2000 | Allirot et al. ............... 361/685 |
| 6,313,985 | B1 | * | 11/2001 | Chen et al. ................. 361/685 |
| 6,341,059 | B1 | * | 1/2002 | Kohler et al. ............... 361/685 |
| 6,373,695 | B1 | * | 4/2002 | Cheng ........................ 361/685 |
| 6,590,766 | B2 | * | 7/2003 | Sheng-Hsiung et al. .... 361/685 |

FOREIGN PATENT DOCUMENTS

JP       A-11-144444      5/1999

* cited by examiner

Primary Examiner—Kamand Cuneo
Assistant Examiner—Dameon E. Levi
(74) Attorney, Agent, or Firm—Morgan Lewis & Bockius LLP (57) ABSTRACT

An outer casing of an electric equipment including: a front panel; a base case having a bottom plate portion and a pair of side plate portions; a top case having a roof portion, a pair of side plate portions, a roof portion protruding piece, and a pair of side plate protruding pieces; and a fixing member. A longitudinal width of each of side plate protruding pieces is set smaller than a longitudinal width of the recess portion for a predetermined length. The outer casing further includes a pair of pedestals integrally formed at both end portions of a bottom face of the recess portion with height thereof being set substantially the same as the predetermined length.

9 Claims, 10 Drawing Sheets

OUTER CASING OF ELECTRIC EQUIPMENT

BACKGROUND OF THE INVENTION

1. Field of the Invention

The present invention relates to improvements in an outer casing by which the appearance of a electromagnetic tape apparatus integrated with a disk player, such as a video cassette recorder (VCR) integrated with a DVD player, or the appearance of an electric equipment can be maintained in good style.

2. Description of the Related Art

Figure 9:
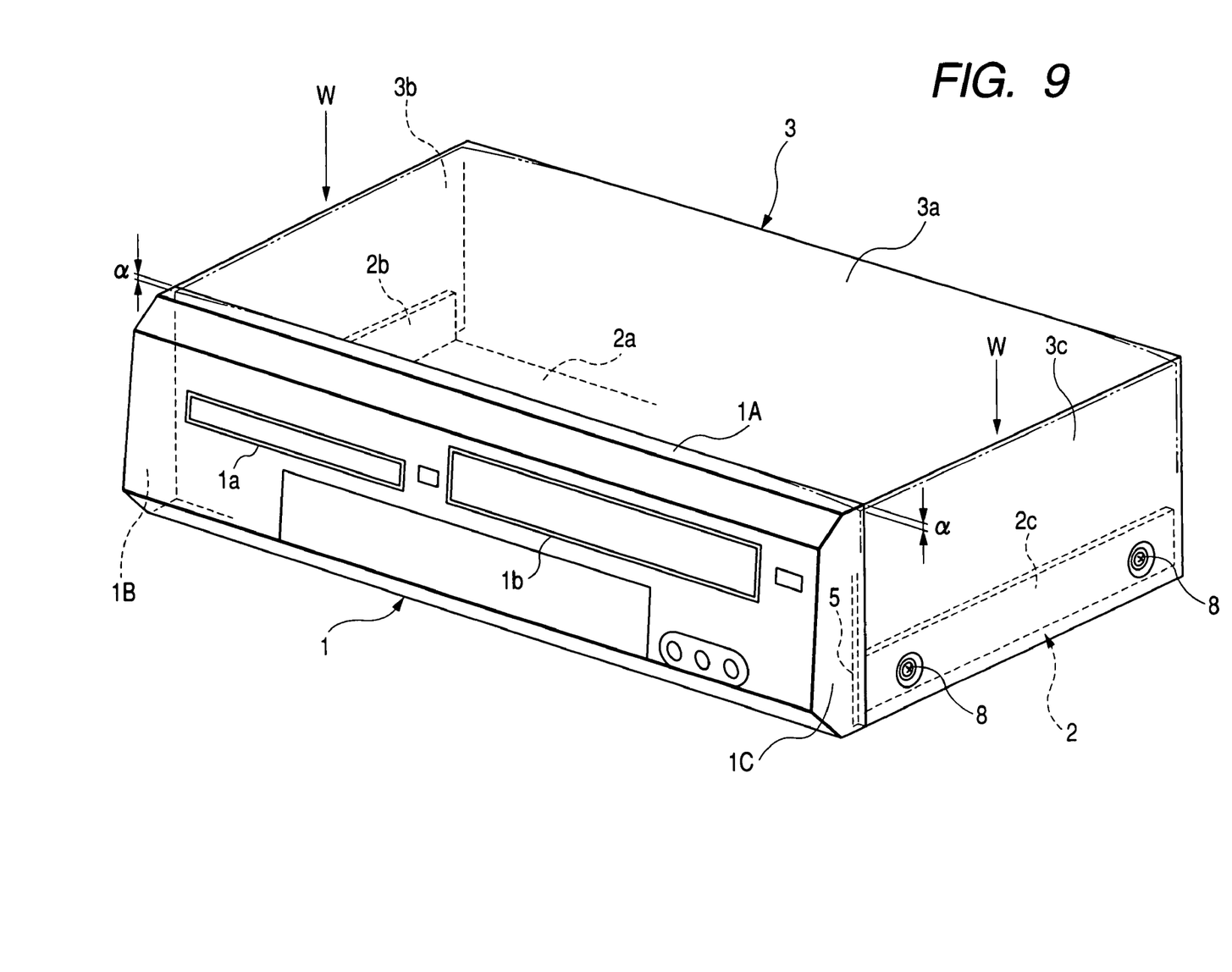
FIG. 9 is a perspective view showing a conventional example.
Figure 10A:
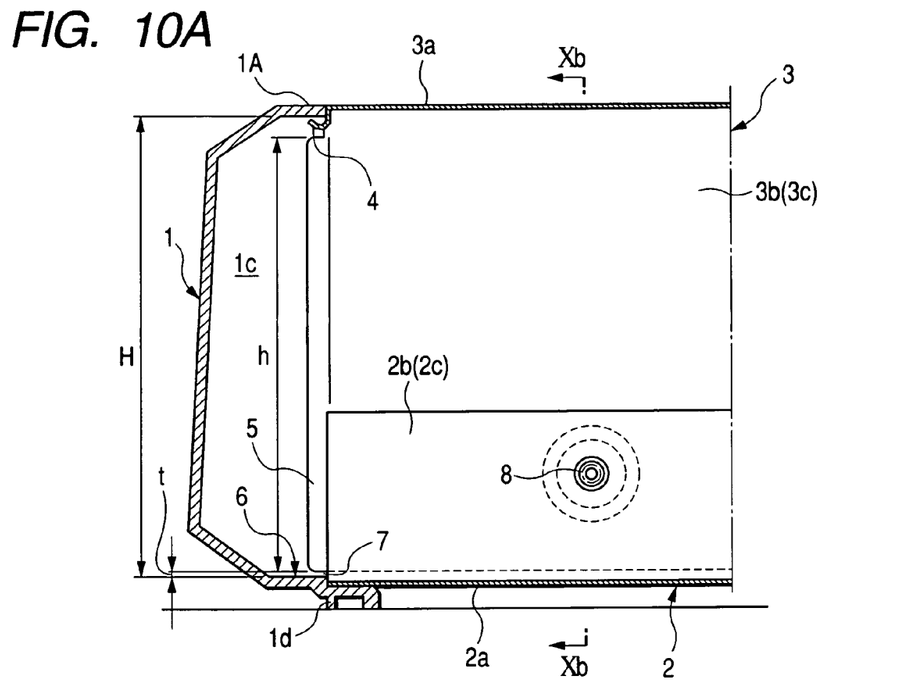
FIG. 10A is a longitudinally sectional view of the conventional example.
Figure 10B:
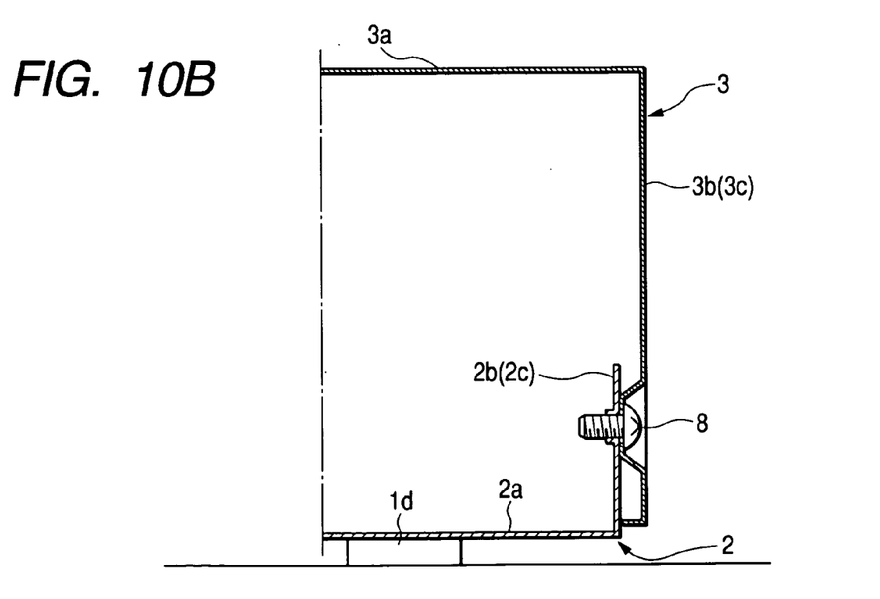
FIG. 10B is a view taken on Xb—Xb line shown in FIG. 10A.

The conventional technique of an outer casing used for an electric equipment is described in JP-A-11-144444. Referring to FIGS. 9, 10A and 10B, an example of the conventional technique is explained below. The document JP-A-11-144444 discloses the technique about an outer casing of an electromagnetic tape apparatus integrated with a disk player. This outer casing is configured as follows. There is provided a front panel 1 made of synthetic resin, on the front of which the disk insertion hole 1a and the cassette insertion hole 1b are arranged in parallel with each other and on the reverse face of which the recess portion 1c is formed. The base case 2 and the substantially C-shaped metallic plate, are arranged at the rear of the front panel 1. The roof portion protruding piece 4, which protrudes forward when the front edge portion of the roof portion 3a of the top case 3 is bent, and a pair of side plate portion protruding pieces 5, which protrude forward when the front edge portions of both side plate portions 3b, 3c of the top case 3 are bent, are respectively inserted into the recess portion 1c of the front panel 1. When longitudinal width h of each side plate portion protruding piece 5 is set smaller than longitudinal width H of the recess portion 1c, the gap 7, the interval t of which is small (for example, approximately 2 mm), is formed between the lower face of each side plate portion protruding piece 5 and the bottom face 6 of the recess portion 1c. The bottom plate portion 2a of the base case 2 is connected to the leg portion 1d protruding from the front panel 1, and both side plate portions 2b, 2c of the base case 2 and the side plate portions 3b, 3c of the top case 3, which overlap both side plate portions 2b, 2c, are fixed to each other by means of screws 8.

The assembling procedure of the outer casing is explained below. After the base case 2 is attached to the front panel 1, the roof plate portion protruding piece 4 of the top case 3 and the side plate portion protruding top case 3 is put on the base case 2, the side plate portions 3b, 3c of the top case 3 are fixed to the side plate portions 2b, 2c of the base case 2 by the screws 8.

SUMMARY OF THE INVENTION

According to the conventional configuration described above, the following problems may be encountered. At the time of assembling the outer casing, the gap 7 is generated between the side plate protruding piece 5, which has been inserted into the recess portion 1c, and the bottom face 6 of the recess portion 1c. Therefore, in some cases, a worker accidentally pushes W both end portions of the roof plate portion 3a of the top case 3, and the side plate portions 3b, 3c of the top case 3 are pushed downward. In the case where the worker has fixed the top case 3 to the base case 2 without becoming aware of this state in which the side plate portions 3b, 3c of the top case 3 have been pushed downward, as shown by the virtual line in FIG. 9, step a is generated between both end portions of the roof plate portion 3a of the top case 3 and the roof plate portion 1A of the front panel 1. Accordingly, the appearance of the outer casing is deteriorated and the commodity value is lowered.

Further, the following problems may be encountered. Since the side plate portions 3b, 3c of the top case 3 are not securely supported, the roof plate portion 3a and the side plate portions 3b, 3c rise and fall like waves, and steps are generated between the roof plate portion 1A of the front panel 1 and the side plate portions 1B, 1C, which deteriorates the appearance of the outer casing.

The present invention has been accomplished in view of the above conventional problems. It is one of objects of the present invention to provide an outer casing of a electromagnetic tape apparatus integrated with a disk player and also to provide an outer casing of an electric equipment in which no steps are generated between the front panel and the top case so that the appearance of the outer casing can be maintained in good style.

According to a first aspect of the invention, there is provided an outer casing of an electric equipment including: a front panel made of synthetic resin and having a recess portion formed at a backside thereof; a base case made of metal and having a bottom plate portion and a pair of side plate portions perpendicularly formed at both side edge of the bottom plate portion, respectively; a top case made of metal and having a roof portion, a pair of side plate portions perpendicularly formed at respective side edge of the bottom plate portion, a roof portion protruding roof portion and protrudes frontward, and a pair of side plate protruding pieces being formed by bending front edge portions of both side plate portions of the top case and protrude frontward; and a screw that fixes each of the pair of side plate portions of the base case and the top case being overlapped with each other while the base case and the top case being arranged at the backside of the front panel and the roof protruding piece and the pair of side plate protruding pieces being inserted in the recess portion of the front panel, wherein a longitudinal width of each of the side plate protruding pieces is set smaller than a longitudinal width of the recess portion for a predetermined length, wherein the outer casing further includes a pair of pedestals integrally formed at both end portions of a bottom face of the recess portion with height thereof being set substantially the same as the predetermined length, wherein the front panel includes: two both end support arms extending backward from portions proximate to both end portions of the lower face of the roof portion of the front panel; a plurality of central support arms which protrude at predetermined intervals at the center of the lower face of the roof portion of the front panel and extend backward; two side support arms extending backward from portions close to the upper and of the front panel; and a disk insertion hole and a cassette insertion hole of an electromagnetic tape device integrated with a disk player that is accommodated in the outer casing, the disk insertion hole and the cassette insertion hole being arranged in parallel with each other and formed on a front face of the front panel, wherein the top case includes: a pair of L-shaped pieces being formed by bending downward at right angles at portions proximate to both end portions of the roof portion protruding piece; and a J-shaped piece being formed by bending downward into an arc shape at a portion of the roof portion protruding piece except for the pair of L-shaped pieces, wherein a forward end portion of each of the pair of L-shaped pieces is engaged in a positioning groove formed in the two both end support arms, wherein the J-shaped piece is put on the central support arms, and wherein each of the side plate protruding piece is inserted into a slit formed in each of the two side support arms.

According to a second aspect of the invention, there is provided an outer casing of an electric equipment including: a front panel having a recess portion formed at a backside thereof; a base case having a bottom plate portion and a pair of side plate portions perpendicularly formed at both side edge of the bottom plate portion, side plate portions perpendicularly formed at respective side edge of the bottom plate portion, a roof portion protruding piece being formed by bending a front edge portion of the roof portion and protrudes frontward, and a pair of side plate protruding pieces being formed by bending front edge portions of both side plate portions of the top case and protrude frontward; and a fixing member that fixes each of the pair of side plate portions of the base case and the top case being overlapped with each other while the base case and the top case being arranged at the backside of the front panel and the roof protruding piece and the pair of side plate protruding pieces being inserted in the recess portion of the front panel, wherein a longitudinal width of each of the side plate protruding pieces is set smaller than a longitudinal width of the recess portion for a predetermined length, and wherein the outer casing further includes a pair of pedestals integrally formed at both end portions of a bottom face of the recess portion with height thereof being set substantially the same as the predetermined length.

BRIEF DESCRIPTION OF THE DRAWINGS

The above objects and advantages of the present invention will become more apparent by describing a reference to the accompanying drawings, wherein.

DETAILED DESCRIPTION OF THE PREFERRED EMBODIMENTS

An information protection apparatus according to an embodiment of the present invention will be described below.

FIGS. 1 through 4B are views showing an outer casing of the electromagnetic tape apparatus integrated with a disk player which is an embodiment of the present invention.

The outer casing is configured as follows. There is provided a front panel 1 made of synthetic resin, on the front of which the disk insertion hole 1a and the cassette insertion hole 1b are arranged in parallel with each other and on the reverse face of which the recess portion 1c is formed. The base case 2 and the top case 3, which are respectively comprised of a substantially C-shaped metallic plate, are arranged at the rear of the front panel 1. The roof portion protruding piece 4, which protrudes forward when the front edge portion of the roof portion 3a of the top case 3 is bent, and a pair of side plate portion protruding pieces 5, which protrude forward when the front edge portions of both side plate portions 3b, 3c of the top case 3 are bent, are respectively inserted into the recess portion 1c of the front panel 1. The bottom plate portion 2a of the base case 2 is connected to the leg portion 1d protruding from the front panel 1, and both side plate portions 2b, 2c of the base case 2 and the side plate portions 3b, 3c of the top case 3, which overlap both side plate portions 2b, 2c, are fixed to each other by means of screws 8.

The assembling procedure of the outer casing is explained below. After the base case 2 is attached to the front panel 1, the roof plate portion protruding piece 4 of the top case 3 and the side plate portion protruding piece 5 are inserted into the recess portion 1c. After the top case 3 is put on the base case 2, the side plate portions 3b, 3c of the top case 3 are fixed to the side plate portions 2b, 2c of the base case 2 by the screws 8.

Figure 1:
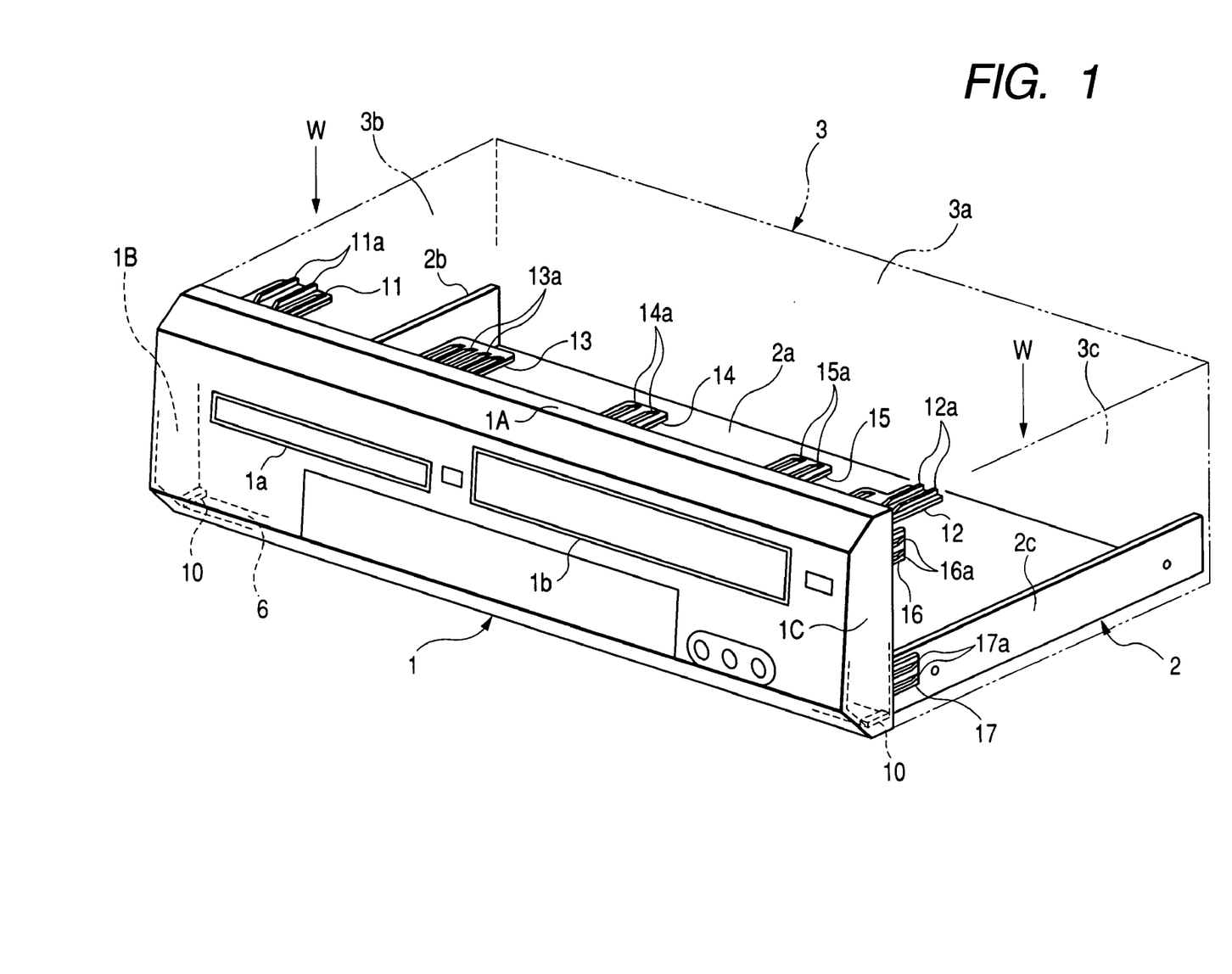
FIG. 1 is a perspective view showing an electromagnetic tape apparatus integrated with a disk player of an embodiment of the present invention.
Figure 2:
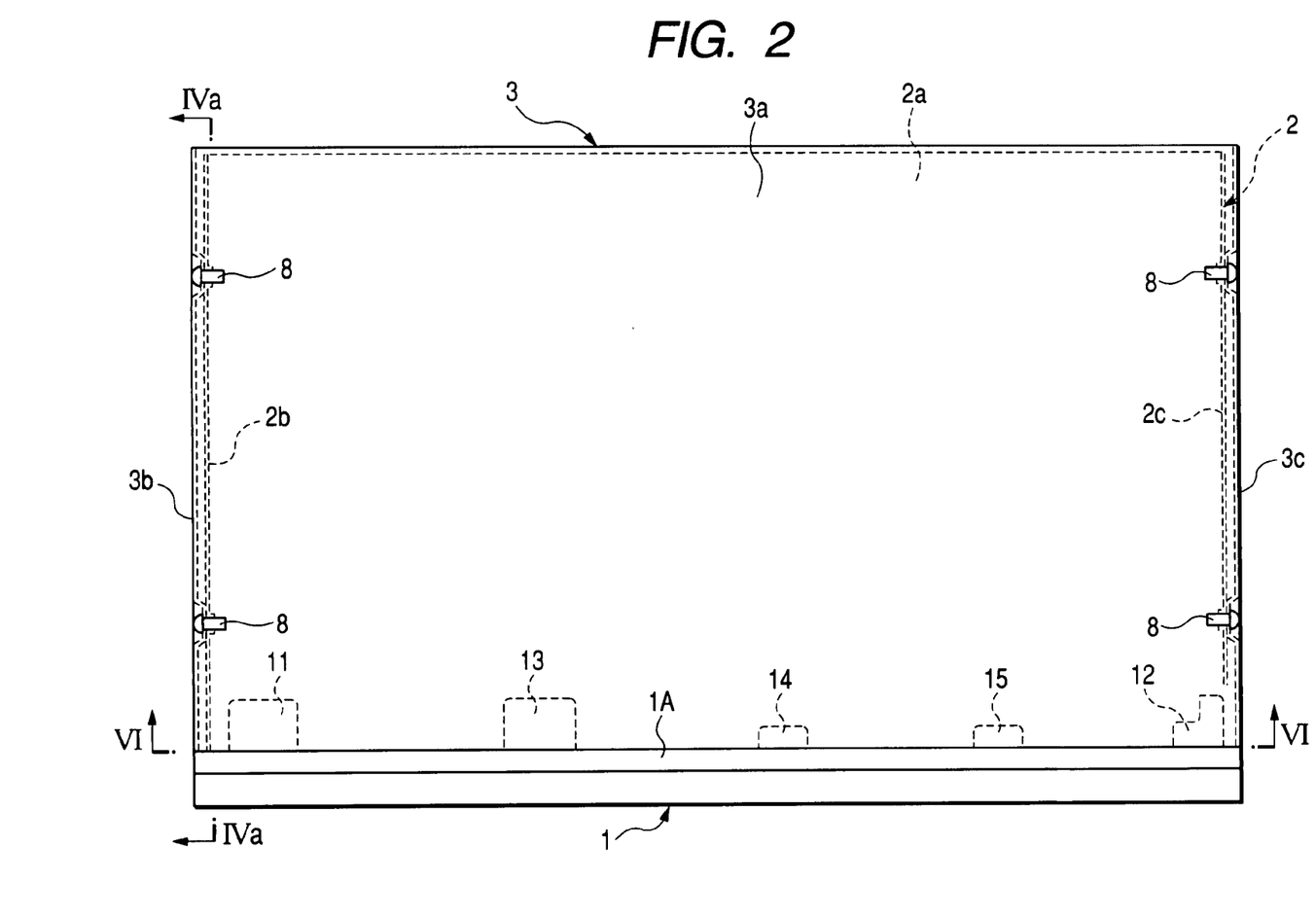
FIG. 2 is a plan view of the electromagnetic tape apparatus.
Figure 3:
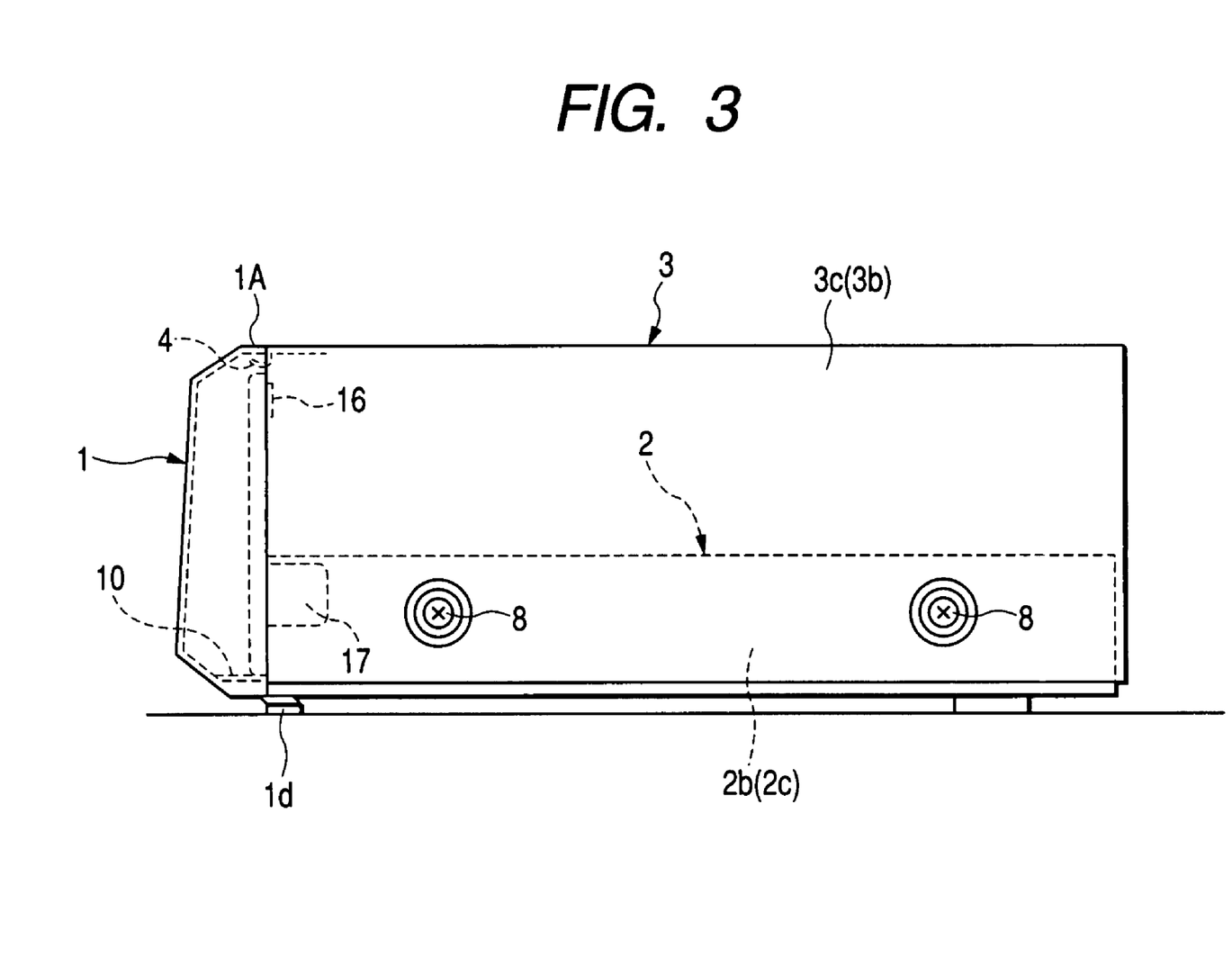
FIG. 3 is a side view of the electromagnetic tape apparatus.
Figure 4A:
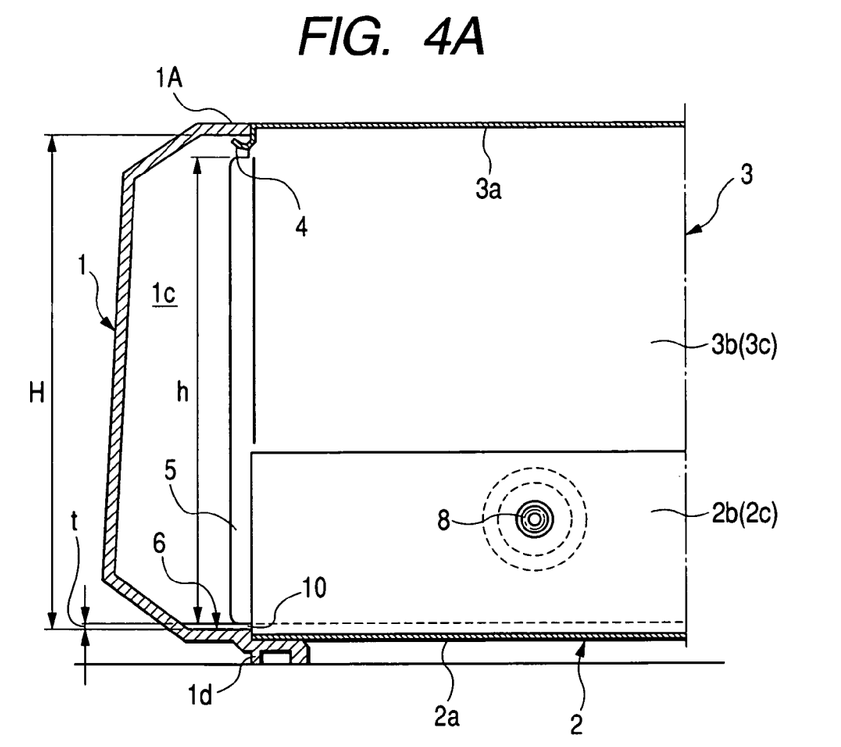
FIG. 4A is a view taken on a IVa—IVa line shown in FIG. 2.
Figure 4B:
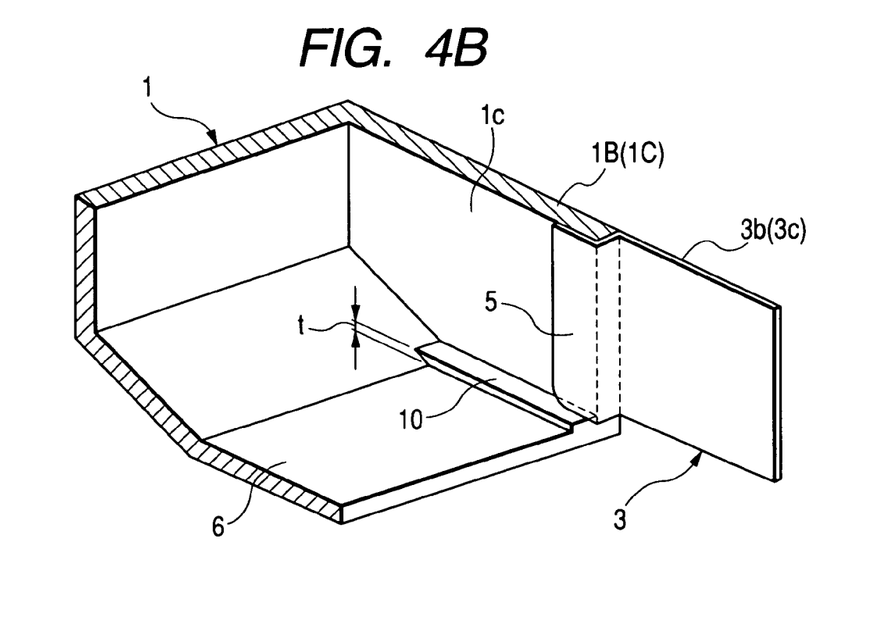
FIG. 4B is a perspective view of a substantial part of the electromagnetic tape apparatus.

In the embodiment, longitudinal width h of each side plate portion protruding piece 5 of the top case 3 is set smaller than longitudinal width H of the recess portion 1c of the front panel 1. Due to the foregoing, a pair of right and left pedestals 10, the height of which is substantially t which is the same as the interval t of the gap 7 (shown in FIG. 10A) formed between the lower face of the each side plate portion protruding piece 5 and the bottom face 6 of the recess portion 1c, are integrally formed at both end portions of the bottom face 6 of the recess portion 1c.

According to the above structure, at the time of assembling the outer casing, when the side plate portion protruding pieces 5 of the top case 3 are inserted into the recess portion 1c of the front panel 1, a lower face of each side plate protruding piece 5 comes into contact with or comes close to the upper face of each pedestal 10. Therefore, when the top case 3 is fixed to the base case 2 with screws 8, even if a worker accidentally pushes W both end portions of the roof plate 3a of the top case 3, there is no possibility that the side plate portions 3b, 3c of the top case 3 are pushed downward. Therefore, unlike the conventional structure, there is no possibility that steps a are generated between both end portions of the roof plate portion 3a of the top case 3 and the roof plate portion 1A of the front panel 1.

Figure 5:
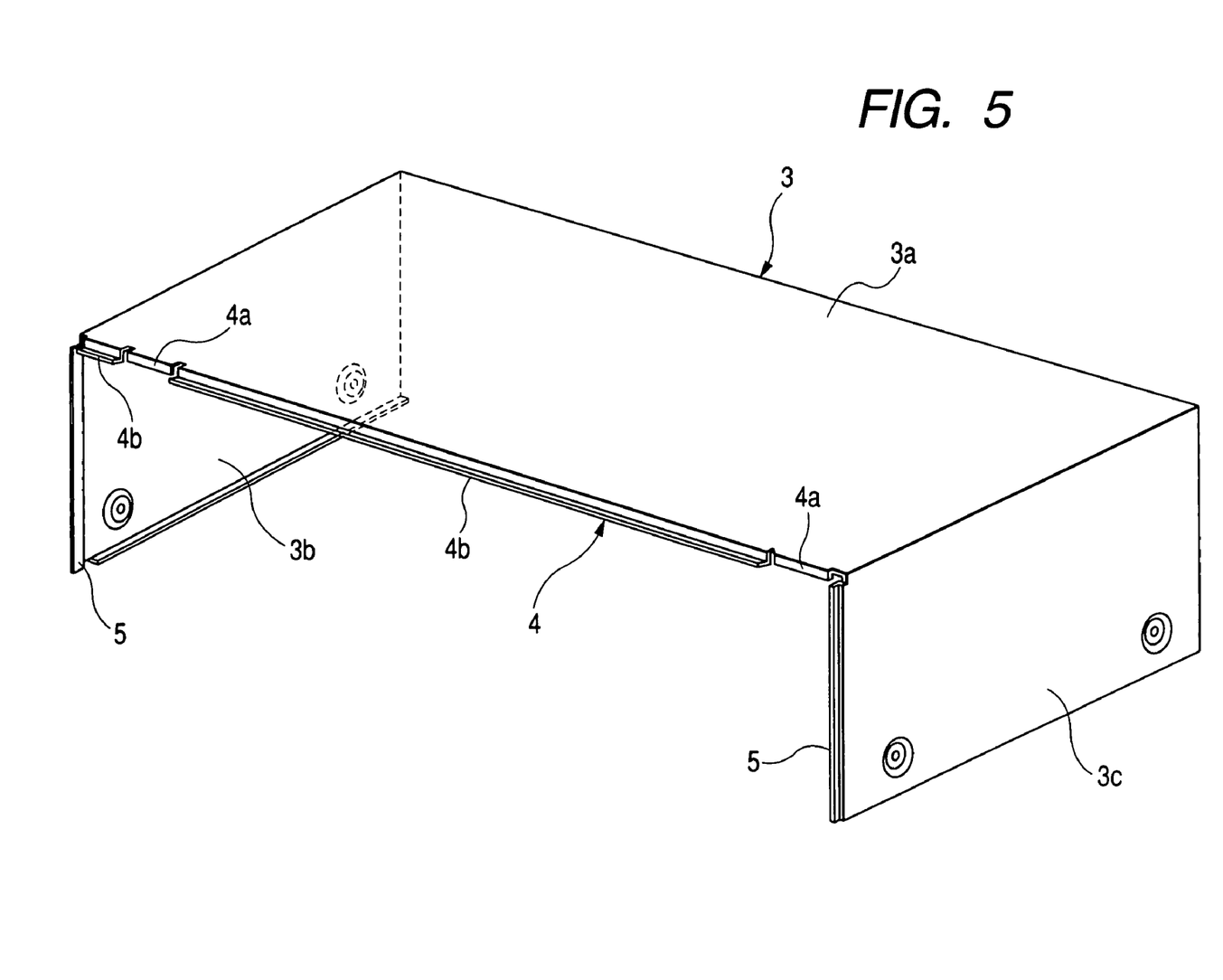
FIG. 5 is a perspective view of a top case of the electromagnetic tape apparatus.
Figure 6:
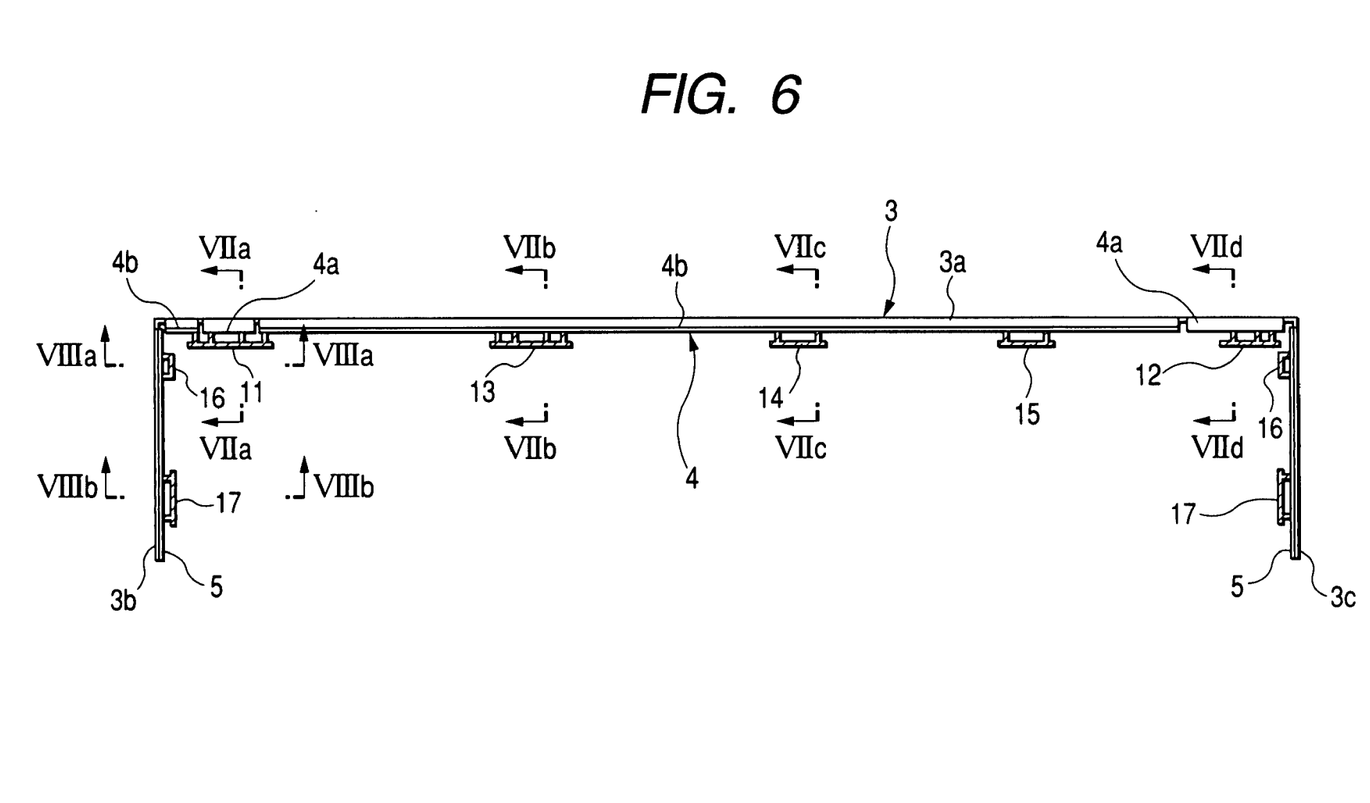
FIG. 6 is a perspective view taken on a VI—VI line shown in FIG. 2.
Figure 7A:
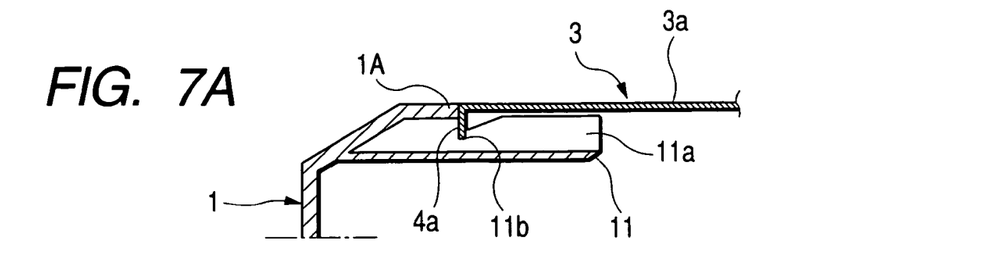
FIG. 7A is a view taken on a VIIa—VIIa line shown in FIG. 6.
Figure 7B:
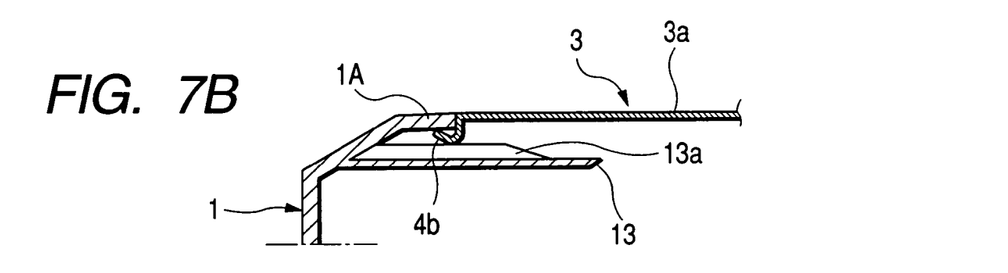
FIG. 7B is a view taken on VIIb—VIIb line shown in FIG. 6.
Figure 7C:
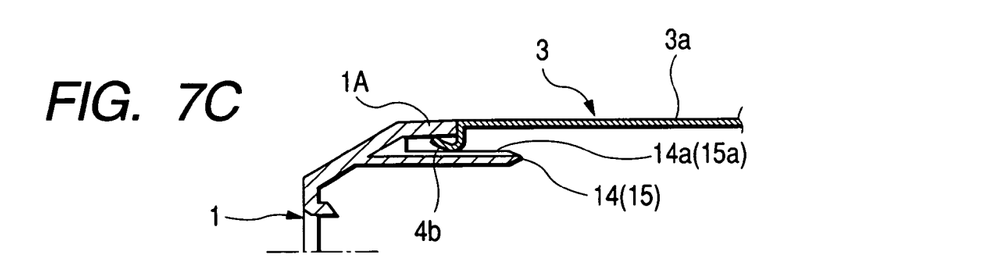
FIG. 7C is a view taken on VIIc—VIIc line shown in FIG. 6.
Figure 7D:
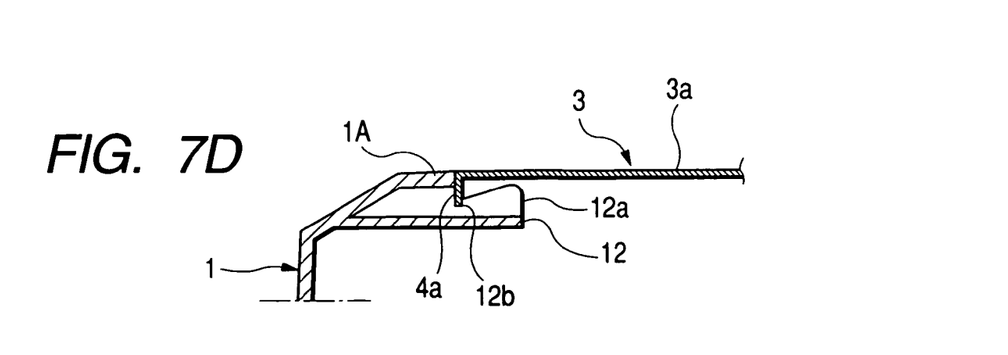
FIG. 7D is a view taken on VIId—VIId line shown in FIG. 6.

As shown in FIGS. 5 and 6, a pair of right and left L-shaped pieces 4a are formed when portions in the vicinity of both end portions of the roof plate protruding pieces 4 of the top case 3 are bent downward at a right angle, and J-shaped pieces 4b are formed when portions of the roof plate protruding pieces 4 except both L-shaped pieces 4a are bent downward to an arcuate shape. As shown in FIGS. 7A and 7D, the forward end portions of the above L-shaped pieces 4a are engaged in the positioning grooves 11b, 12b formed in the ribs 11a, 12a on two both end support arms 11, 12 which extend backward from portions in the vicinity of both end portions on the lower face of the roof plate portion 1A of the front panel 1. As shown in FIGS. 7B and 7C, the above J-shaped pieces 4b are set in the ribs 13a to 15a on a plurality of central support arms 13 to 15 (three central support arms in this case) extending backward protruding at predetermined intervals in the central portion on the lower face of the roof plate portion 1A of the front panel 1.

According to the above configuration, the roof plate portion 3a of the top case 3 is supported by two both end support arms 11, 12 and a plurality of central support arms 13 to 15 via the L-shaped pieces 4a and the J-shaped pieces 4b. Therefore, the roof plate portion 3a of the top case 3 can be linearly held so that an upper face of the roof plate portion 3a can not rise and fall like waves, and the roof plate portion 3a of the top case 3 can be set on the same plane as the upper face of the roof plate portion 1A of the front panel 1. Especially, since a forward end portion of each L-shaped piece 4a is engaged in the positioning groove 11b, 12b formed in each both end support arm 11, 12, they can be connected to each other in good style so that a gap can not be generated between the roof plate portion 3a of the top case 3 and the roof plate portion 1A of the front panel 1.

Figure 8A:
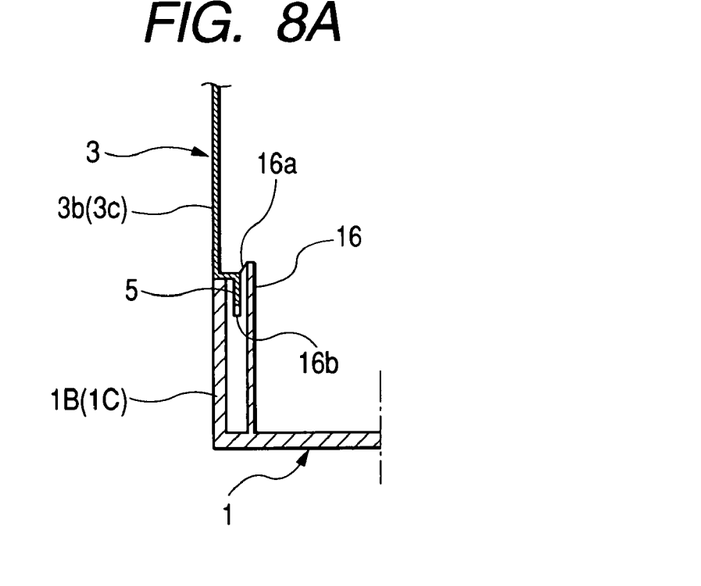
FIG. 8A is a view taken on VIIIa—VIIIa line shown in FIG. 6.
Figure 8B:
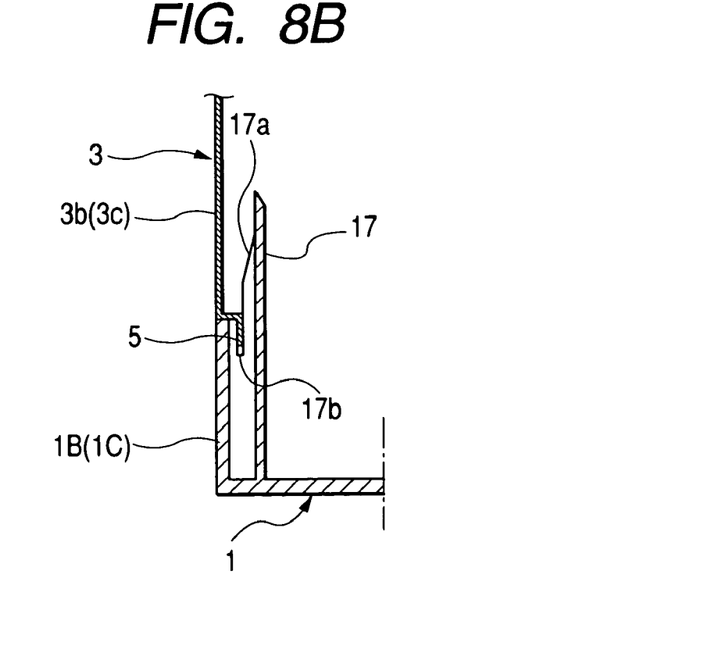
FIG. 8B is a view taken on VIIIb—VIIIb line shown in FIG. 6.

As shown in FIGS. 8A and 8B, the side plate portion protruding pieces 5 of the top case 3 are inserted into the slits 16b, 17b formed in the ribs 16a, 17a on the two side portion support arms 16, 17 extending backward from portions in the vicinity of the upper and lower end portions on the inside of the side plate portions 1B, 1C of the front panel 1.

According to the above configuration, the side plate portions 3b, 3c of the top case 3 can be linearly held so that the side plate portions 3b, 3c can not rise and fall like waves. Therefore, the side plate portions 3b, 3c of the top case 3 can be connected to the side plate portions 1B, 1C of the front panel 1 in good style so that the side plate portions 3b, 3c can be set on the same planes as the side plate portions 1B, 1C of the front panel 1.

In the case of a front panel 1, the lateral width of which is large, in which the disk insertion hole 1a and the cassette insertion hole 1b are arranged in parallel with each other, it is possible to connect the top case 3 to the front panel 1 so that they can be arranged on the same plane in good style. Therefore, it is possible to provide a electromagnetic tape apparatus integrated with a disk player of a high commodity value.

In the above embodiment, an electromagnetic tape apparatus integrated with a disk player is taken as an example, and explanations are made into it. However, it should be noted that the present invention is not limited to the above specific embodiment. For example, the present invention can be applied to outer casings of various electric equipments such as a single body type disk player, a single body type electromagnetic tape apparatus and so forth.

According to the embodiment, at the time of assembling the outer casing, when the side plate portion protruding pieces of the top case are inserted into the recess portion of the front panel, a lower face of each side plate protruding piece comes into contact with or comes close to each of the upper faces of the pedestals integrally formed at both end portions of the bottom face of the recess portion. Therefore, at the time of fixing the top case to the base case with screws, even if a worker accidentally pushes both end portions of the roof plate of the top case, there is no possibility that the side plate portions of the top case are pushed downward. Therefore, unlike the conventional structure, there is no possibility that steps are generated between both end portions of the roof plate portion of the top case and the roof plate portion of the front panel.

Since two both end support arms and a plurality of central support arms support the roof plate portion of the top case via L-shaped pieces and J-shaped pieces, it is possible to linearly hold the top case so that an upper face of the top case can not rise and fall like waves. Therefore, the roof plate portion of the top case can be set on the same plane as the upper face of the roof plate portion of the front panel. Especially, since a forward end portion of each L-shaped piece is engaged in the positioning groove formed in each both end support arm, they can be connected to each other in good style so that a gap can not be generated between the roof plate portion of the top case and the roof plate portion of the front panel.

Further, since the side plate protruding pieces of the top case are inserted into the slits formed in two upper and lower side support arms, the side plate portions of the top case can be linearly held so that the side plate portions can not rise and fall like waves, and the side plate portions of the top case can be connected to the side plate portions of the front panel in good style so that they can be arranged on the same plane.

In short, even in the case of a front panel, the lateral width of which is large, in which the disk insertion hole and the cassette insertion hole are arranged in parallel with each other, it is possible to connect the top case to the front panel so that they can be arranged on the same plane in good style. Therefore, it is possible to provide a electromagnetic tape apparatus integrated with a disk player of a high commodity value.

According to the embodiment, at the time of assembling the outer casing, when the side plate protruding pieces of the top case are inserted into the recess portion of the front panel, lower faces of the protruding pieces of the side plate portions come into contact with or come close to upper faces of the pedestals integrally formed at both end portions of the bottom face of the recess portion. Therefore, when the top case is fixed to the base case by screws, even if a worker accidentally pushes both end portions of the roof plate portion of the top case, there is no possibility that the side plate portions of the top case are pushed downward. Accordingly, unlike the conventional case, there is no possibility that a step is generated between both end portions of the roof plate portion of the top case and the roof plate portion of the front panel. Therefore, the appearance can be maintained in good style, and the commodity value can be maintained high.

According to the embodiment, since two both end support arms and a plurality of central support arms support the roof plate portion of the top case via L-shaped pieces and J-shaped pieces, it is possible to linearly hold the top case so that an upper face of the top case can not rise and fall like waves. Therefore, the roof plate portion of the top case can be set on the same plane as the upper face of the roof plate portion of the front panel. Especially, since a forward end portion of each L-shaped piece is engaged in the positioning groove formed in each both end support arm, they can be connected to each other in good style so that a gap can not be generated between the roof plate portion of the top case and the roof plate portion of the front panel.

According to the embodiment, since the side plate protruding pieces of the top case are inserted into the slits formed in two upper and lower side support arms, the side plate portions of the top case can be linearly held so that the side plate portions can not rise and fall like waves, and the side plate portions of the top case can be connected to the side plate portions of the front panel in good style so that they can be arranged on the same plane.

According to the embodiment, even in the case of a front panel, the lateral width of which is large, in which the disk insertion hole and the cassette insertion hole are arranged in parallel with each other, it is possible to connect the top case to the front panel so that they can be arranged on the same plane in good style. Therefore, it is possible to provide a electromagnetic tape apparatus integrated with a disk player of a high commodity value.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An outer casing of an electric equipment comprising:
   a front panel made of synthetic resin and having a recess portion formed at a backside thereof;
   a base case made of metal and having a bottom plate portion and a pair of side plate portions perpendicularly formed at both side edge of the bottom plate portion, respectively;
   a top case made of metal and having a roof portion, a pair of side plate portions perpendicularly formed at respective side edge of the bottom plate portion, a roof portion protruding piece being formed by bending a front edge portion of the roof portion and protrudes frontward, and a pair of side plate protruding pieces being formed by bending front edge portions of both side plate portions of the top case and protrude frontward; and
   a screw that fixes each of the pair of side plate portions of the base case and the top case being overlapped with each other while the base case and the top case being arranged at the backside of the front panel and the roof protruding piece and the pair of side plate protruding pieces being inserted in the recess portion of the front panel;
   wherein a longitudinal width of each of the side plate protruding pieces is set smaller than a longitudinal width of the recess portion for a predetermined length;
   wherein the outer casing further comprises a pair of pedestals integrally formed at both end portions of a bottom face of the recess portion with height thereof being set substantially the same as the predetermined length;
   wherein the front panel includes:
   two both end support arms extending backward from portions proximate to both end portions of the lower face of the roof portion of the front panel;
   a plurality of central support arms which protrude at predetermined intervals at the center of the lower face of the roof portion of the front panel and extend backward;
   two side support arms extending backward from portions close to the upper and lower end portions of the inner side of each side plate of the front panel; and
   a disk insertion hole and a cassette insertion hole of an electromagnetic tape device integrated with a disk player that is accommodated in the outer casing, the disk insertion hole and the cassette insertion hole being arranged in parallel with each other and formed on a front face of the front panel;
   wherein the top case includes:
   a pair of L-shaped pieces being formed by bending downward at right angles at portions proximate to both end portions of the roof portion protruding piece; and
   a J-shaped piece being formed by bending downward into an arc shape at a portion of the roof portion protruding piece except for the pair of L-shaped pieces;
   wherein a forward end portion of each of the pair of L-shaped pieces is engaged in a positioning groove formed in the two both end support arms;
   wherein the J-shaped piece is put on the central support arms; and
   wherein each of the side plate protruding piece is inserted into a slit formed in each of the two side support arms.

2. An outer casing of an electric equipment comprising:
   a front panel having a recess portion formed at a backside thereof;
   a base case having a bottom plate portion and a pair of side plate portions perpendicularly formed at both side edge of the bottom plate portion, respectively;
   a top case having a roof portion, a pair of side plate portions perpendicularly formed at respective side edge of the bottom plate portion, a roof portion protruding piece being formed by bending a front edge portion of the roof portion and protrudes frontward, and a pair of side plate protruding pieces being formed by bending front edge portions of both side plate portions of the top case and protrude frontward; and
   a fixing member that fixes each of the pair of side plate portions of the base case and the top case being overlapped with each other while the base case and the top case being arranged at the backside of the front panel and the roof protruding piece and the pair of side plate protruding pieces being inserted in the recess portion of the front panel;
   wherein a longitudinal width of each of the side plate protruding pieces is set smaller than a longitudinal width of the recess portion for a predetermined length; and
   wherein the outer casing further comprises a pair of pedestals integrally formed at both end portions of a bottom face of the recess portion with height thereof being set substantially the same as the predetermined length.

3. The outer casing according to claim 2, wherein the front panel is made of synthetic resin.

4. The outer casing according to claim 2, wherein the base case is made of metal.

5. The outer casing according to claim 2, wherein the top case is made of metal.

6. The outer casing according to claim 2, wherein the fixing member includes a screw.

7. The outer casing according to claim 2, wherein the front panel includes:
   two both end support arms extending backward from portions proximate to both end portions of the lower face of the roof portion of the front panel; and
   a plurality of central support arms which protrude at predetermined intervals at the center of the lower face of the roof portion of the front panel and extend backward;
   wherein the top case includes:
   a pair of L-shaped pieces being formed by bending downward at right angles at portions proximate to both end portions of the roof portion protruding piece; and a J-shaped piece being formed by bending downward into an arc shape at a portion of the roof portion protruding piece except for the pair of L-shaped pieces, wherein a forward end portion of each of the pair of L-shaped pieces is engaged in a positioning groove formed in the two both end support arms; and wherein the J-shaped piece is put on the central support arms.

8. The outer casing according to claim 2, wherein the front panel includes two side support arms extending backward from portions close to the upper and lower end portions of the inner side of each side plate of the front panel; and wherein each of the side plate protruding piece is inserted into a slit formed in each of the two side support arms.

9. The outer casing according to claim 2, wherein the front panel includes a disk insertion hole and a cassette insertion hole of an electromagnetic tape device integrated with a disk player that is accommodated in the outer casing, the disk insertion hole and the cassette insertion hole being arranged in parallel with each other and formed on a front face of the front panel.

* * * * *